(12) United States Patent
McMaster et al.

(10) Patent No.: US 11,314,858 B2
(45) Date of Patent: Apr. 26, 2022

(54) EVENT MONITORING

(71) Applicant: Comcast Cable Communications, LLC, Philadelphia, PA (US)

(72) Inventors: William McMaster, Las Vegas, NV (US); Brian Xu, San Jose, CA (US); Sanjay Dorairaj, San Jose, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 438 days.

(21) Appl. No.: 16/156,554

(22) Filed: Oct. 10, 2018

(65) Prior Publication Data
US 2020/0117798 A1 Apr. 16, 2020

(51) Int. Cl.
*H04L 29/06* (2006.01)
*G06F 21/55* (2013.01)
*G06F 21/50* (2013.01)
*G06F 11/14* (2006.01)

(52) U.S. Cl.
CPC ........ *G06F 21/554* (2013.01); *G06F 11/1464* (2013.01); *G06F 21/50* (2013.01); *H04L 63/145* (2013.01); *G06F 2221/034* (2013.01); *G06F 2221/2107* (2013.01); *G06F 2221/2143* (2013.01)

(58) Field of Classification Search
CPC .......... G06F 21/10; G06F 21/31; G06F 21/50; G06F 21/554; G06F 2221/2111; G06F 11/1464; G06F 2221/034; G06F 2221/2107; G06F 2221/2143; H04L 63/08; H04L 63/145
See application file for complete search history.

(56) References Cited

U.S. PATENT DOCUMENTS

| | | | | |
|---|---|---|---|---|
| 6,715,085 B2 * | 3/2004 | Foster | ................... | G06F 21/575 713/152 |
| 6,970,081 B1 | 11/2005 | Cheng | | |
| 7,103,915 B2 * | 9/2006 | Redlich | ............... | G06F 21/6209 713/166 |
| 7,793,355 B2 * | 9/2010 | Little | ...................... | G06F 21/30 713/168 |
| 7,917,963 B2 * | 3/2011 | Goyal | ................. | G06F 21/6209 726/29 |
| 8,176,320 B1 * | 5/2012 | Belanger | ............. | G06F 21/6218 713/166 |
| 8,302,205 B2 * | 10/2012 | Kanai | ................... | G06F 21/608 713/176 |

(Continued)

OTHER PUBLICATIONS

"Defining Encryption Profiles," Oracle, https://docs.oracle.com/cd/E91187_01/pt855pbr2/eng/pt/tsec/task_DefiningEncryptionProfiles-c077a2.html?pli=ul_d169e196_tsec, 2017. 2 pages.

*Primary Examiner* — Hosuk Song
(74) *Attorney, Agent, or Firm* — Banner & Witcoff, Ltd.

(57) ABSTRACT

A computing device may detect events such as a break-in, fire, flood, movement of people between different areas or zones within a defined area, cyberattacks, movement of devices away from the defined area, etc. If an event is detected, the computing device may take action to protect devices, data on the devices, and/or accounts accessible by the devices. The devices may encrypt, backup data, and/or delete data. The computing device may communicate with other computing devices about events that have been detected.

20 Claims, 7 Drawing Sheets

(56) References Cited

U.S. PATENT DOCUMENTS

| | | | |
|---|---|---|---|
| 8,542,833 B2* | 9/2013 | Devol | G06F 21/305 |
| | | | 380/259 |
| 8,613,107 B2* | 12/2013 | Peckover | G06F 21/10 |
| | | | 726/29 |
| 8,966,580 B2* | 2/2015 | Sela | G06F 21/10 |
| | | | 380/201 |
| 8,978,157 B2* | 3/2015 | Niimura | G06F 21/608 |
| | | | 726/2 |
| 2007/0090944 A1 | 4/2007 | Du Breuil | |
| 2007/0143857 A1 | 6/2007 | Ansari | |
| 2012/0309354 A1 | 12/2012 | Du | |
| 2014/0266669 A1 | 9/2014 | Fadell et al. | |
| 2014/0282877 A1 | 9/2014 | Mahaffey et al. | |
| 2017/0063750 A1* | 3/2017 | Vardhan | H04W 12/02 |

* cited by examiner

EVENT MONITORING

BACKGROUND

Protecting devices, data, and accounts can be challenging due to the many threats that exist such as natural disasters, thieves, and cyberattacks. It would be beneficial to have a system that can protect against these threats.

SUMMARY

The following summary presents a simplified summary of certain features. The summary is not an extensive overview and is not intended to identify key or critical elements.

A computing device may receive information from sensors. The sensors may detect events such as a break-in, fire, flood, movement of people between different areas or zones within a defined area, cyberattacks, movement of devices away from the defined area, etc. If an event is detected by a sensor, the computing device may take action to protect devices, data on the devices, and/or accounts accessible by the devices. The devices may encrypt, backup data, and/or delete data in response to an event. The computing device may communicate with other computing devices about events that have been detected. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of various illustrative examples, reference is made to the accompanying drawings, which form a part hereof, and in which is shown, by way of illustration, various examples in which aspects of the disclosure may be practiced. It is to be understood that other examples may be utilized and structural or functional modifications may be made, without departing from the scope of the present disclosure.

Figure 1:
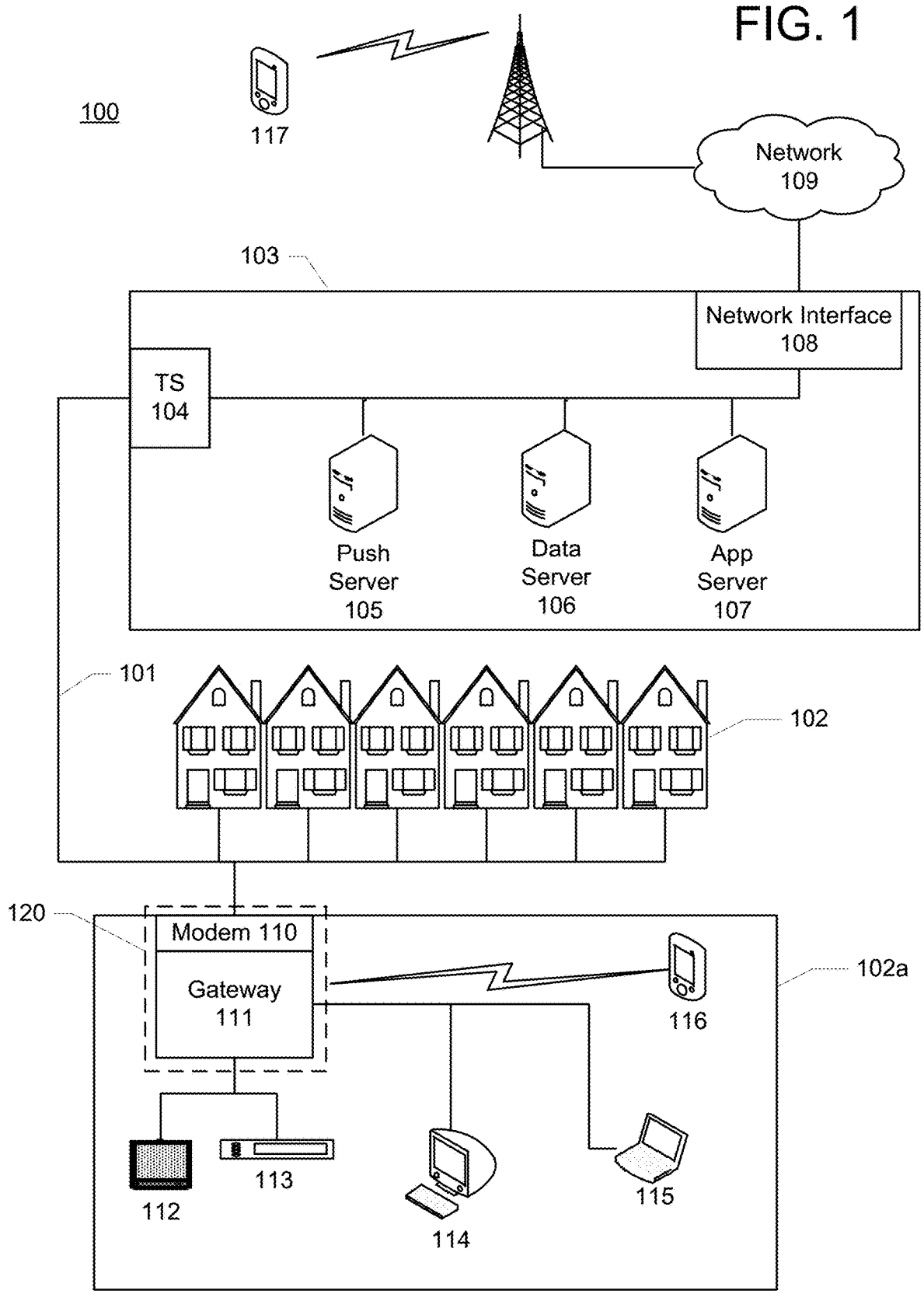
FIG. 1 shows an example information distribution network.

FIG. 1 shows an example communication network 100 on which many of the various features described herein may be implemented. The network 100 may be any type of information distribution network, such as satellite, telephone, cellular, wireless, etc. The network 100 may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101 and the premises 102 may have receivers used to receive and to process those signals.

There may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). For example, the interface 104 may be a cable modem termination system (CMTS), which may be a computing device configured to manage communications between devices on the network of the links 101 and backend devices such as servers 105-107. The interface 104 may be as specified in a standard, such as the Data Over Cable Service Interface Specification (DOCSIS) standard, published by Cable Television Laboratories, Inc. (a.k.a CableLabs), or it may be a similar or modified interface. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. These networks 109 may transmit content to the local office 103 via a plurality of variable size, fixed duration video fragments. Additionally, and/or alternatively, these networks 109 may transmit content to the local office 103 via a plurality of variable size, variable duration video fragments. The network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. The local office 103 may include a push notification server 105. The push notification server 105 may generate push notifications to deliver data or commands to the various premises 102 in the network or to the devices in the premises 102 that are configured to detect such notifications. The local office 103 may also include one or more content servers 106. The content servers 106 may be one or more computing devices that are configured to provide content to users at their premises. This content may be, for example, video content such as video on demand movies or television programs, songs, text listings, or other types of content. The content server 106 may include software to validate user identities and entitlements, to locate, retrieve and receive requested content, to encrypt the content, and to initiate delivery by streaming of the content to the requesting user or device. The content may comprise a plurality of fixed size, variable duration video fragments. The local office 103 may include a load balancer (not illustrated) to route service requests to one of the content servers 106. The load balancer might route the service requests based on utilization or availability of each of the content servers 106.

The local office 103 may also include one or more application servers 107. An application server 107 may be a computing device configured to offer any desired service, and may run various languages and operating systems, such as servlets and JSP pages running on TOMCAT/MYSQL, OSX, BSD, UBUNTU, REDHAT, HTML5, JAVASCRIPT, AJAX, or COMET. The application server 107 may be responsible for collecting television program listings information and generating a data download for electronic program guide listings. In some aspects of the disclosure, the application server 107 may be responsible for monitoring user viewing habits and collecting that information for use in selecting advertisements. The application server 107 may be responsible for formatting and inserting advertisements in a video stream being transmitted to the premises 102. Although shown separately, one of ordinary skill in the art will appreciate that the push server 105, the content server 106, and the application server 107 may be combined. Further, here the push server 105, content server 106, and the application server 107 are shown generally, and it will be understood that they may each contain memory storing computer executable instructions to cause a processor to perform steps described herein or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone-DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others.

The gateway interface device 111 or a display device 112 may be used to view video content delivered from the content server 106. Additionally, the gateway interface device 111 or a display device 112 may be used to schedule recordings of the video content or to display a program listing indicating start and end times for video content.

Each premises of the multiple premises 102 may have a monitoring system, as described in FIG. 3-FIG. 7. Each monitoring system may be connected to the gateway interface device. The monitoring systems may communicate with each other via the gateway interface device and each premise's interface (e.g., interface 120).

Figure 2:
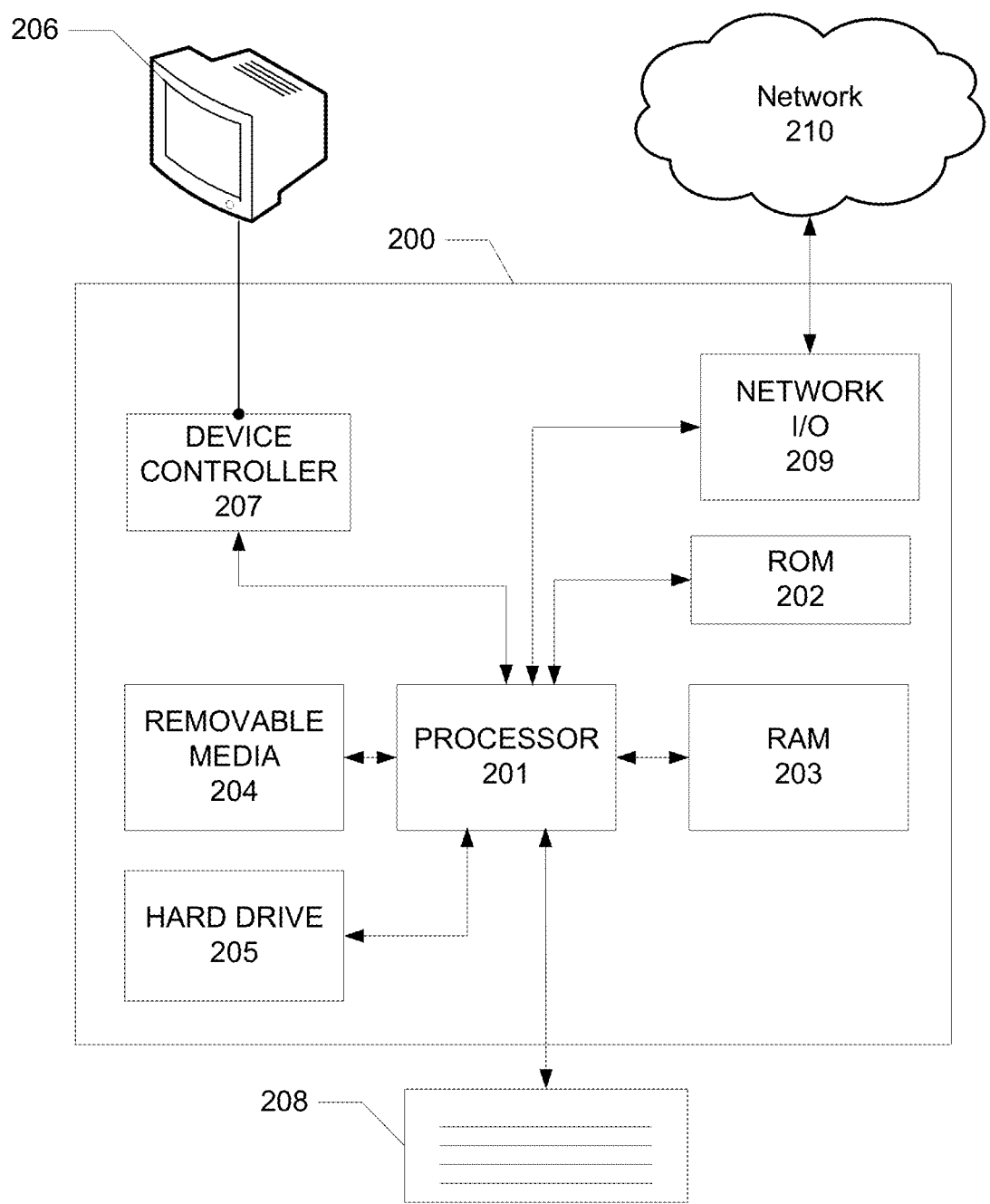
FIG. 2 shows hardware elements of an example computing device.

FIG. 2 shows an example computing device that may be used to implement any of the methods described herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, a compact disk (CD) or a digital versatile disk (DVD), a floppy disk drive, or any other desired storage medium. The storage medium may comprise a plurality of sectors, wherein a size of each sector of the plurality of sectors is approximately a multiple of a substantially fixed fragment size. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, a wireless interface, or a combination of the two. The network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network.

FIG. 2 shows a hardware configuration of the device 200, but it should be understood that some or all of the illustrated components may be implemented as software. Modifications may be made to add, to remove, to combine, or to divide components of the computing device 200 as desired. Additionally, the components illustrated may be implemented using basic computing devices and components, and the same components (e.g., a processor 201, a ROM storage 202, a display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types if executed by a processor in a computer or other data processing device. The computer executable instructions may be stored on one or more computer readable media such as a hard disk, an optical disk, a removable storage media, a solid state memory, a RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
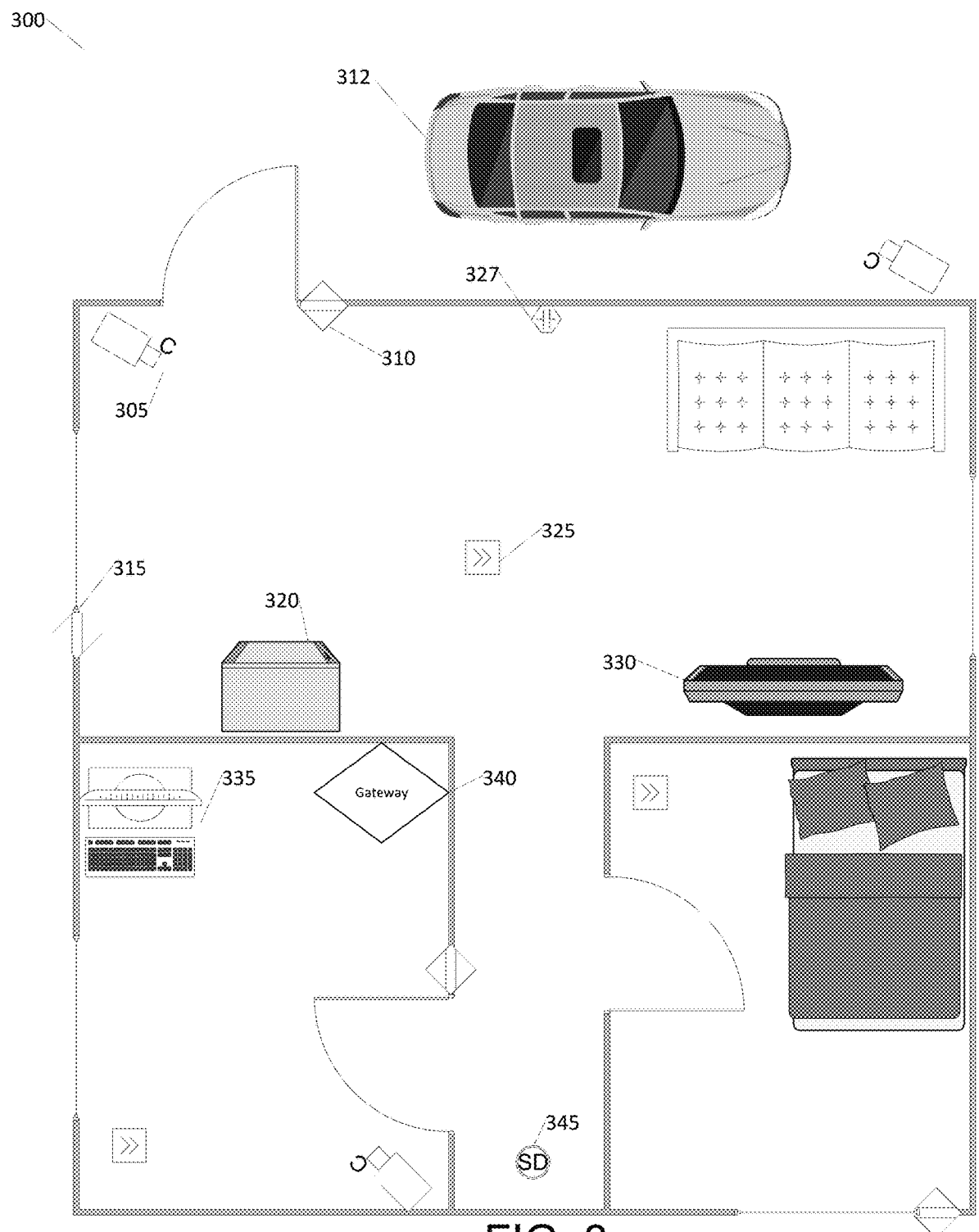
FIG. 3 shows an example monitoring system.

FIG. 3 shows an example monitoring system 300. The monitoring system may be configured to monitor for events that occur within a defined area. The monitoring system 300 may contain a gateway 340 that connects with the Internet. The gateway 340 may comprise the gateway interface device 111. The monitoring system 300 may also include a number of sensors including a camera 305, a door sensor 310, a window sensor 315, a motion detector 325, a flood sensor 327, a smoke detector 345. Sensors may also include one or more carbon monoxide detectors, flood detectors, gas leak sensors, or any other type of sensors. The system may include one or more of each type of sensor. A sensor may comprise a computing device configured (e.g., via executable instructions stored in a memory) to detect computer-related events (e.g., malicious software, suspicious software, suspicious computer activity, logins, etc.). The gateway 340 may communicate with and control one or more of the sensors. The sensors may detect events and may send information corresponding to the events to another component of the monitoring system. The sensors may also send detection information to a remote location. After detecting an event, a sensor may record information. For example, after motion is detected, a camera may begin to record video around the location where motion was detected. Sensors may also record information continuously and may send recently recorded data if an event is detected. Recorded information may be sent to computing devices and/or to other monitoring systems to notify them of an event that has occurred or is occurring.

The monitoring system 300 may also include or be associated with a number of devices such as a computer 335, television 330, smart refrigerator 320, a motorized vehicle 312, drones, other types of user devices (e.g., a smartphone, a personal digital assistant, a voice recognition assistant, a laptop computer, a tablet computer, a desktop computer, a smart home device, a listening device, a device located within a vehicle) and/or any other electronic device or computing device. Some devices may contain sensors within them. For example, the monitoring system may use a camera that is part of a computer as a sensor. The monitoring system may also use a vehicle alarm system that is part of the motorized vehicle as a sensor. The monitoring system may also be associated with a number of accounts. Accounts may include subscription accounts, banking, or any other online account. Accounts may include entertainment accounts such as Netflix, Amazon Prime, Hulu, etc.

The monitoring system may communicate with the devices, sensors via Wi-Fi, Bluetooth, the Internet, or any other wireless communication method. An example monitoring system may also include other devices such as a smart phone, tablet, smart watch, other wearable devices, other smart appliances, etc. The gateway 340 may communicate with and control one or more of the devices.

The defined area may be the area of a premises (e.g., a premises of the various premises 102). Additionally/alternatively, the defined area may include the area in which any sensor of the monitoring system is able to detect an event.

An event may include any type of action that is detectable by the sensors of the monitoring system. Events may include a break-in, fire, flood, movement of any type of object including people and animals. Events may also include any type of cyber attack (e.g., on a device that is associated with the monitoring system), gas leak or other leak. Events may also include actions that involve devices that are associated with the monitoring system. For example, events may include logging into a device, disconnecting a device from a network, moving a device from the defined area to a location outside of the defined area, or moving a device within one zone inside the defined area to a different zone within the defined area. The monitoring system may determine a location of a device using for example GPS, signal strength between the device and the gateway (including Wi-Fi or Bluetooth signal strength), etc.

Events may also include actions that involve accounts of a user (e.g., Netflix, Amazon Prime, banking, or other accounts). For example, events may include logging into an account, making a purchase on an account, changing personal or contact information associated with an account, etc. A monitoring system may have stored in memory a trusted person associated with an account to notify if an event is detected.

Figure 4:
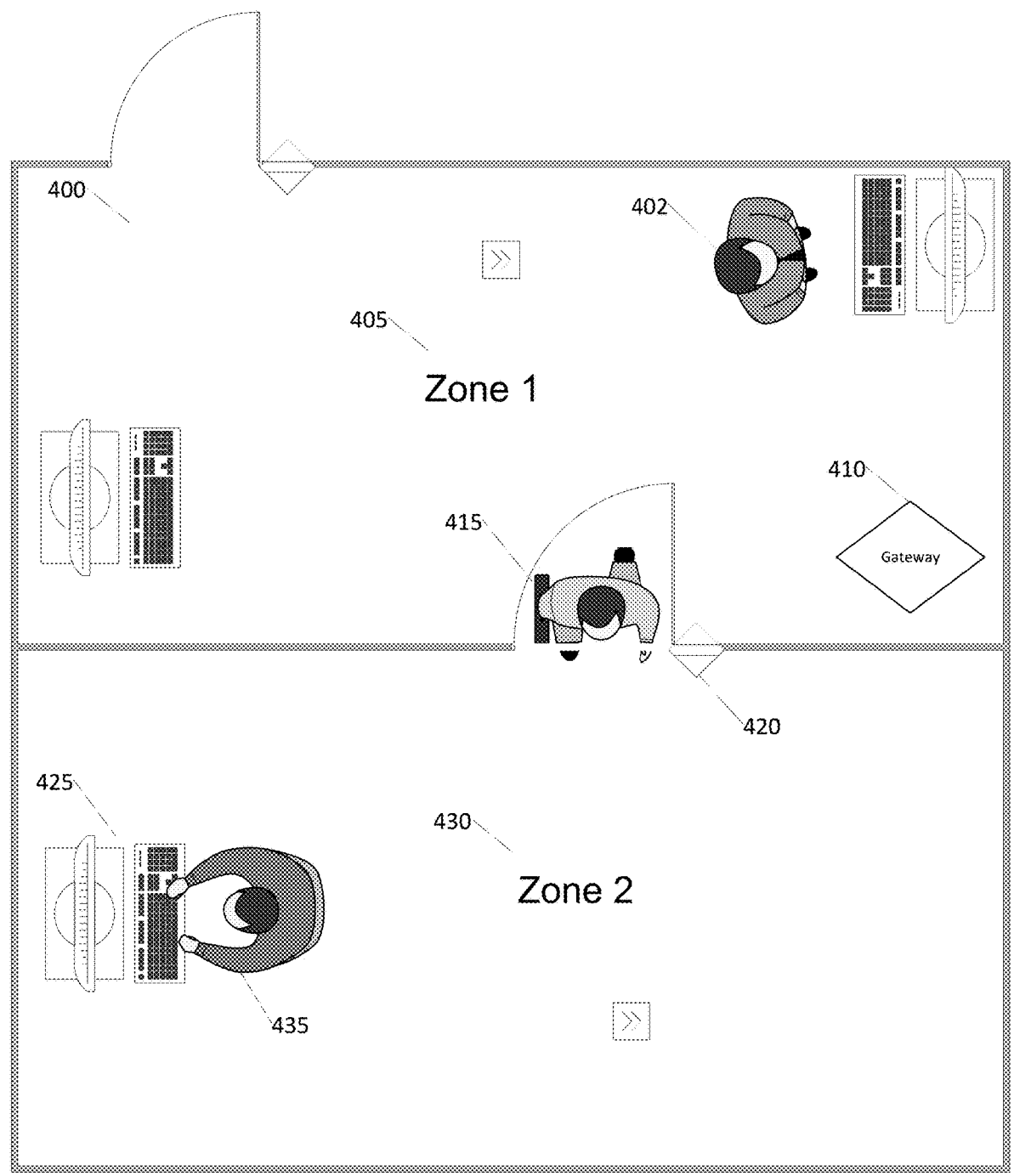
FIG. 4 shows an example monitoring system 400 with a zone layout within a defined area.

FIG. 4 shows an example monitoring system 400 with a zone layout within a defined area. The monitoring system 400 may include any device, sensor, or other component that is contained in the monitoring system 300. The monitoring system 400 may be split into one or more zones such as zone 405 and zone 430. A zone may include any sized area including a closet, an office, a room, an entire floor, multiple floors, an entire building, etc.

Each zone may have a number of members that belong to the zone. For example, person 402 may belong to zone 405 and person 435 may be a member of zone 430. People that are not a member of any existing zone may be identified as visitors. The monitoring system 400 may have a sensor 420 that can detect if someone or something moves from one zone to another zone. For example, sensor 420 may detect if a visitor 415 moves from zone 405 to zone 430. The sensor 420 may be able to identify who is moving into zone 430. For example, the sensor 420 may identify a person entering zone 430 using an RFID chip. Each member may have a personalized RFID or members of a zone may share an RFID. The RFID may indicate which zone the person is currently a member. If the person does not have an RFID that the sensor recognizes, the sensor may identify the person as a visitor. The sensor may communicate the detected movement and the identification of the person to the gateway 410. The gateway 410 may perform an action based on the communication from the sensor. For example, if the visitor 415 crosses into zone 430, the gateway 410 may instruct the computer 425 to lock the screen. When performing an action, the gateway 410 may also account for preferences of members of zone 430 such as the person 435.

Figure 5:
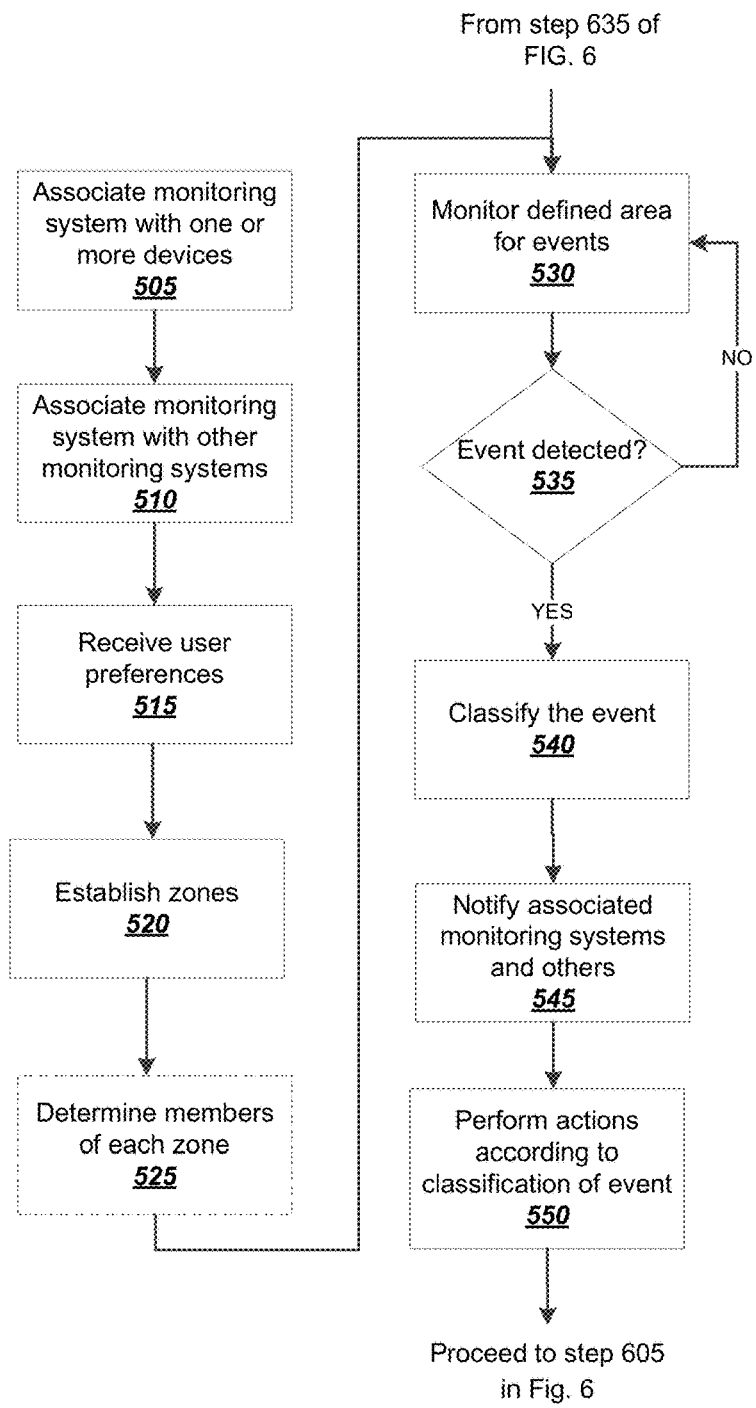
FIG. 5 shows an example method for monitoring events within a defined area.

FIG. 5 shows an example method for monitoring events within a defined area. The example method may be performed by a monitoring system that may comprise servers 105-107, network 109, computing devices 114-116, monitoring system 300, and/or any other component described in FIGS. 1-7. The monitoring system may perform calculations or actions via a computing device within a defined area and/or may perform calculations or actions via a computing device located remotely from the defined area, such as in the local office 103. One or more of the operations described in connection with FIG. 5 may also or alternatively be performed by one or more other computing devices.

At step 505, a monitoring system may be associated with one or more devices. The monitoring system may establish a connection between one or more devices within a defined area. The monitoring system may communicate with the devices and may receive information about the devices. For example, the monitoring system may receive location information from the devices. The location information may be obtained through a variety of sources including global positioning satellite (GPS), or a Wi-Fi location service. The monitoring system may communicate with software such as anti-virus software that is running on the devices. The monitoring system may receive information regarding an intrusion onto a device from the anti-virus software.

The monitoring system may control associated devices. The monitoring system may be able to cause an associated device to perform any operation a user can perform on the device. For example, the monitoring system may cause the device to download data, install/uninstall an application, delete files or data, turn off/on input/output sources, connect to or disconnect from a network, etc. The monitoring system may control information security on the associated devices. For example, the monitoring system may control software on each device that scans for malware and may cause the device to scan for and/or delete malware.

At step 510 the monitoring system may be associated with other monitoring systems. The monitoring system may establish a connection with other monitoring systems. The other monitoring systems may be located nearby the monitoring system. For example, a number of monitoring systems within a residential neighborhood may establish connections with each other. The monitoring systems may each have a number of components as illustrated in FIG. 3 or any other figure described herein.

Monitoring systems that are associated with each other may share information regarding events detected within their respective defined areas as described below in step 545. User preferences may govern what information is shared as described below.

In step 515, user preferences may be received. The user preferences may be input by a user through a graphical user interface (GUI) such as GUI 700 shown in FIG. 7. For example, GUI 700 may have a column 710 where devices can be entered. Devices may be identified to the user with a device name such as device names 750 and 755. GUI 700 may also have a setting 720 where the user can select whether each device is allowed to connect to other monitoring systems (e.g., monitoring systems that the user's monitoring system is associated with as discussed in step 510 of FIG. 5) without triggering an event. For example according to setting 730, the device associated with device name 750 may be allowed to connect to a gateway of an associated monitoring system without triggering an event, but the device associated with device name 755 (family room TV) may not be allowed to connect to a gateway of an associated monitoring system without triggering an event.

The user preferences may indicate what action the user prefers one or more devices to perform when different kinds of events are detected. The GUI 700 may contain a location 740 for inputting preferences for actions to be performed if an event is triggered. The action can be specific to a device that is involved in the event. For example, if an event is detected that involves the device associated with device name 755, then an alarm may be triggered based on the user's preference 760. Other preferences on actions may include tracking the device, encrypting and backing up data, and/or sending a notification to a user. The button for Additional Preferences 770 may allow a user to enter additional preferences for items discussed below.

The user preferences may indicate each party that information is shared with if an event is detected. User preferences may indicate a number of user devices to share information with if an event is detected. Information may be shared with devices that are associated with a monitoring system. Information may be shared in the form of a notification. User preferences may indicate that information should be shared with other monitoring systems if an event is detected.

The user preferences may indicate what information is shared if an event is detected. For example, user preferences may indicate that any or all of the following may be shared after detecting an event: the classification of the event, time of the event, information recorded by sensors that detected the event (e.g., camera footage of the event, carbon monoxide levels recorded by a sensor), location of the event within the defined area, devices affected or impacted by the event (e.g., which devices were stolen in a break-in, which devices were damaged by water in a flood). User preferences may indicate that information recorded by a sensor may be shared with other devices or monitoring systems.

The user preferences may indicate how information is shared if an event is detected. User preferences may indicate that information is shared via radio, internet, a local area network, Wi-Fi, and/or Bluetooth, and other types of communication methods.

In step 520, zones may be established within the defined area. A device (e.g., gateway 340) may receive as input a map of the defined area and may use the map with GPS, for example, to determine what room each sensor is in. In this example, the map may contain GPS coordinates for one or more points on the map. Sensors may also be able to determine their GPS coordinates and communicate the coordinates with the gateway 340 or another computing device. Additionally/alternatively, a user may enter GPS coordinates for each sensor manually.

Additionally/alternatively, the map may contain boundaries for a number of rooms or areas. Each room or area may be a zone within the defined area. Sensors may be assigned manually to each area. The area an event is occurring may be determined based on the assigned area of a sensor that has detected the event. The monitoring system may also determine what floor each sensor is on and may designate each floor as a separate zone.

A device may determine zones by grouping sensors together. A zone may be defined by the coverage area of a collection of sensors. Each sensor may be assigned to a zone. A sensor may be assigned to a zone through input from a user. If a sensor is triggered, a notification may be sent to the gateway 340 by the sensor. The gateway 340 may store the zone and sensor association and may determine that an event is occurring in the zone assigned to or associated with the sensor.

A sensor for identification may be placed at the border of one or more zones. The sensor may identify each person leaving or entering a zone. The sensor may use radio-frequency identification (RFID), facial recognition, passwords or passcodes, etc. to identify a person leaving or entering the zone. If someone moves into or out of a zone, the action may be classified as a zone movement event and an action may be taken as described below in step 635 of FIG. 6. User preferences received in step 515 may also indicate the number of zones within the defined area. A user may combine or split up zones within the defined area via a GUI.

In step 525, members of each zone may optionally be determined. A device may use information containing a list of people and the zone each person belongs to or is allowed to access. In step 530, the defined area may be monitored for events. Sensors may be used to detect events (as described with FIG. 3). In step 535, a device may determine whether an event has been detected. An event may be detected if a sensor is triggered. An event may also be detected if a measurement of a sensor exceeds a threshold. For example, if carbon monoxide rises above a level, then a carbon monoxide detector may be triggered and the monitoring system may determine that an event has occurred In step 540, the event may be classified. Information from one or more sensors may be used to classify an event. The event may be classified based on the type of sensor that was triggered during the event. For example, if a window sensor is triggered, then the event may be classified as a break-in. If the smoke detector is triggered then the event may be classified as a fire. If a flood detector is triggered then the event may be classified as a flood. If carbon monoxide rises above a level, then a carbon monoxide detector may notify gateway 340 or other computing device that a carbon monoxide event has occurred.

A classification of an event may indicate a severity of the event. The severity may depend on the location of a sensor. If sensors located near sensitive areas (e.g., within 5, 10, or 20 feet) are triggered then the event may be classified as a high severity event. If sensors located near the outside edge of a defined area or far from a sensitive area (e.g., greater than 20 feet from a sensitive area) are triggered then the event may be determined to be a low severity event. If sensors are not near a sensitive area and are not far from a sensitive area then the event may be classified as a middle severity event. A user may designate which areas are sensitive within a defined area. A user may have control over which sensors trigger high severity, middle severity, and low severity events. For example, a user may input which sensors are near sensitive areas so that if those sensors are triggered, the event is classified as high severity. A user may label which sensors are far from sensitive areas. A user may designate which sensors are neither near a sensitive area nor far from a sensitive area. If sensors that are neither near nor far from a sensitive area detect an event, the event may be classified as a middle severity event.

Classifying an event may involve determining a state of one or more devices that are associated with a monitoring system. For example, if a device is not connected to the gateway of the monitoring system then an event may be triggered and classified as a missing device event.

Classifying an event may involve determining an alarm state of the monitoring system. Alarm states may include home, away, stay, night, panic, encryption, and off. The monitoring system may have a code that can be input by a user to change the alarm state. For example, the code may be entered if a person returns home to change the alarm state from "away" to "off." The code may be a number, password, and/or biometric (e.g., finger print, face scan, eye scan, etc.).

The monitoring system may have a separate duress code that allows a user to change the alarm state and simultaneously send a notification to other monitoring systems, devices, and/or law enforcement. A duress code may be used in a situation where someone or something is forcing a user to change the alarm state or provide access to a device. For example, a thief may force a user to change the alarm state from "away" to "off." If the user enters a duress code, a notification may be sent to law enforcement without the thief's knowledge and it may appear that the alarm state has been changed to "off." The duress code may be a number, password, and/or biometric (e.g., finger print, face scan, eye scan, etc.). Additionally/alternatively, each device may have a duress code that may be used to unlock the device. If a duress code is used to unlock a device, the device may allow access and visibility to only a set of duress files. The duress files may contain fake data. The duress files may contain fake passwords, fake contact information, fake finance information, or any other type of fake data. For example, if someone has forced a user to provide access to a device, the user may provide access to fake data (duress files) instead of sensitive data owned by the user. The duress files may make a thief believe he has gained access to valuable/useful information. Unlocking a device with a duress code may also notify other devices, monitoring systems, and/or law enforcement without triggering an alarm within the defined area.

The away state may be set if a user leaves the house. If the away state is set, any sensor in the defined area may detect an event. If the away state is set, one or more screens of the associated devices may be locked and/or turned off. Data on devices may also be encrypted if the away state is set. If the stay state is set, sensors on the exterior of the defined area (sensors that detect events around the border of the defined area) may be able to detect events while sensors that are not on the border of the defined area may be set not to detect events.

If the alarm is set to the panic state and an event is detected, a specific room/area of the home may be locked (e.g., doors, windows, etc.) to create a safety zone or panic room. Additionally, data may be encrypted and/or backed up on a number of devices. A number of devices within the room/area may be locked if the alarm is set to the panic state.

The monitoring system may have one or more encryption profiles. Devices associated with the monitoring system may be added to an encryption profile. An encryption profile may specify an encryption algorithm to use on a device. An encryption profile may also specify how often to encrypt a device. An encryption file may specify that the device should be encrypted after an event has been detected.

In step 545, monitoring systems and/or other computing devices may be notified of an event that is detected in step 535. The notification may be based on the classification of the event in step 540. The notification may be performed according to the user preferences described above in step 515. There may be default information included with a notification. The default information may include, for example, a classification of the event, time of the event, location of the event (e.g., where in the defined area the event occurred). The notification may contain information such as camera footage or pictures, temperature readings, facial recognition information, speed of an object detected by a motion sensor, audio recordings, etc. Camera/video recordings may be shared with other computing devices and/or monitoring systems. The shared video recording may begin within a predetermined amount of time before a sensor detects an event (e.g., 1 minute, 5 minutes, 30 minutes, 1 hour, etc. before the event) and end within a predetermined time period after the event is detected (e.g., 1 minute, 5 minutes, 30 minutes, 1 hour, etc. after the event).

Others may be notified of an event that is detected and classified. For example, an owner of a property located within the defined area may be notified of an event. People that reside, work, or spend time in the defined area may be notified of an event. The notification may be sent through, for example, a mobile application, text message, and/or email.

Figure 6:
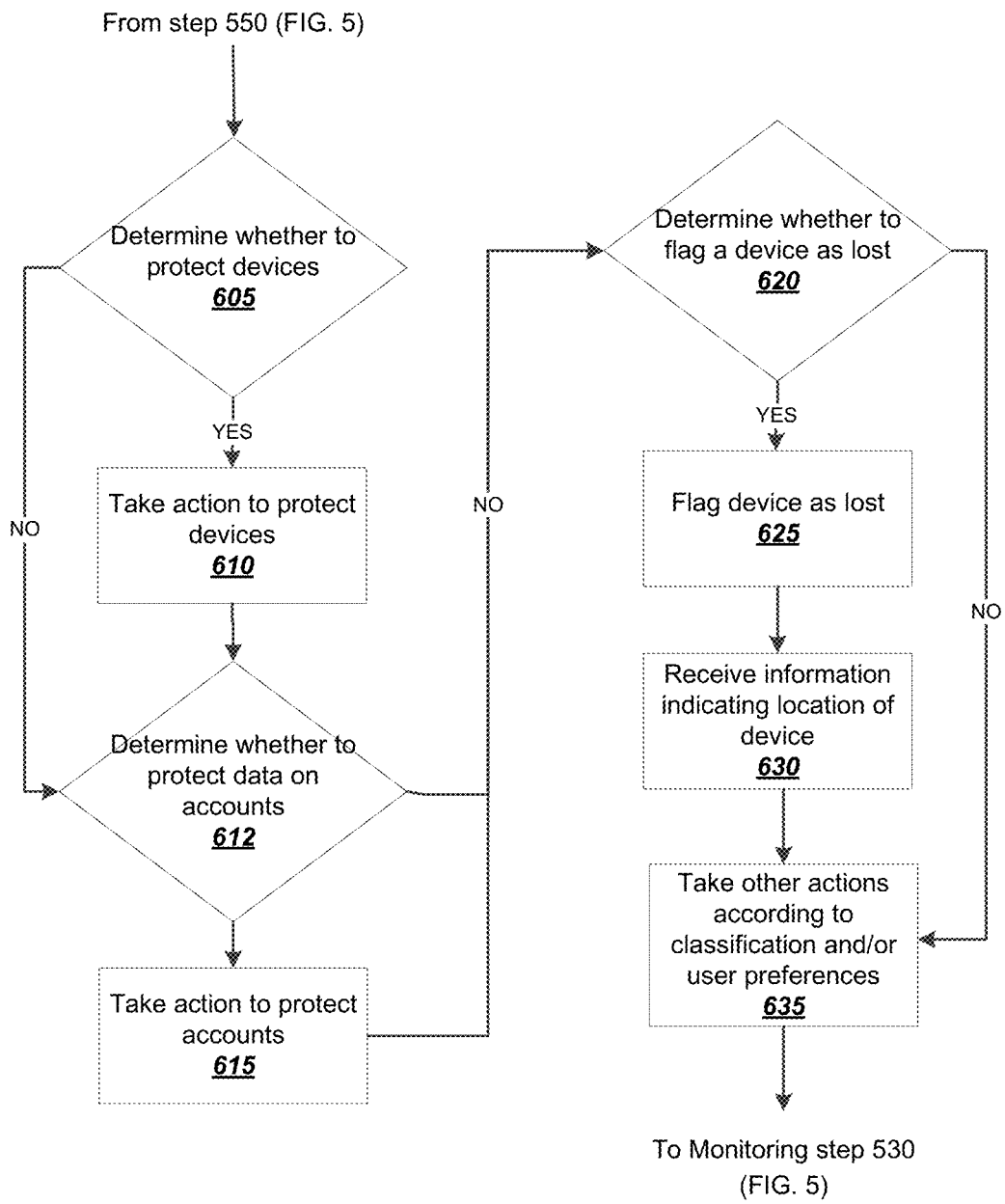
FIG. 6 shows an example method for taking actions if an event is detected in a defined area.
Figure 7:
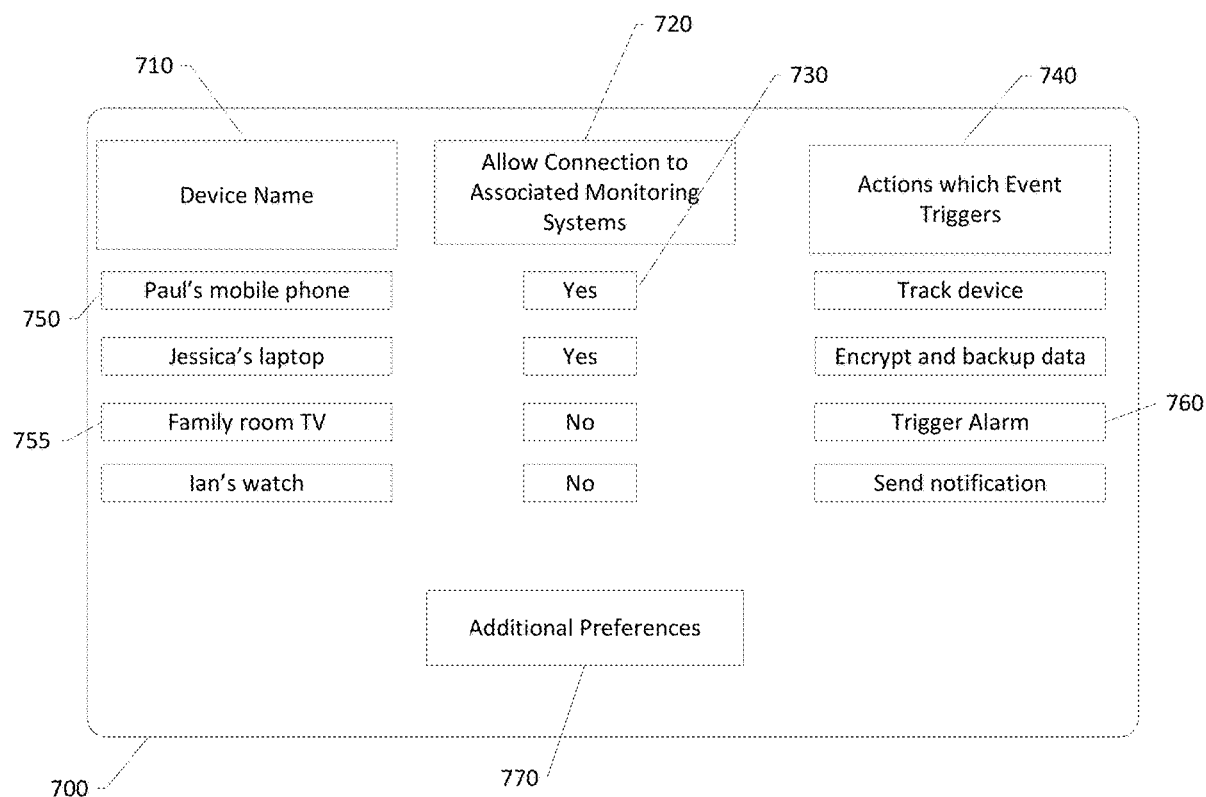
FIG. 7 shows an example graphical user interface for configuring user preferences of a monitoring system.

In step 550, actions may be performed according to the classification of the event. These actions are illustrated in FIG. 6, beginning at step 605. FIG. 6 shows an example method for performing actions if an event is detected in a defined area. Although the following description of FIG. 6 refers to operations performed by a monitoring system (which may be the same monitoring system performing steps of FIG. 5 and/or one or more other monitoring systems), some or all of the steps shown in FIG. 6 may also or alternatively be performed by one or more other computing devices. The system may perform calculations or actions by a computing device within a defined area and/or may perform calculations or actions by a computing device located remotely from the defined area, such as in the local office 103.

In step 605, a monitoring system may determine whether to protect devices. The monitoring system may take into account user preferences, alarm state, and/or the classification of the event in determining whether to protect devices. The monitoring system may determine whether to protect all, some, or none of the devices. The monitoring system may follow the user preferences over a default action if the default action conflicts with user preferences.

The monitoring system may determine whether to protect devices based on of the relative location in which an event occurs with respect to a device. For example, if a sensor is within a predetermined distance (e.g., 5, 10, 20 feet) of a device or is in the same room as the device, then the device may be protected. Additionally/alternatively, actions may be taken to protect devices that are within the same zone as the sensor that detected the event. In some cases, no action may be taken to protect devices located in other zones where no event was detected.

For example, a building may have six businesses with separate office spaces that share the same monitoring system. The office space for each business may be a zone. A monitoring system may individually take action in response to an event occurring in one of the zones while taking no actions in other zones where no event is occurring. For example, during an event (e.g., a motion sensor is triggered if alarm state is set to away) devices in one business may be encrypted, backed-up, or have their data deleted while devices in the other five businesses that share the monitoring system may be unaffected.

Whether to protect devices may be determined based on the classification of the event. If the event does not pose a threat to devices, then it may be determined not to take additional actions to protect devices. For example, if the monitoring system classifies an event as a carbon monoxide leak, then the monitoring system may take no additional actions to protect devices but may instead sound an alarm, notify other monitoring systems or users, and/or notify governmental authorities. The monitoring system may determine to protect devices if there is a break-in within a defined area. For example, if a person triggers a motion detector when the alarm state is set to away then the monitoring system may determine to protect devices as described in step 610.

In step 610, the monitoring system may protect associated devices. The monitoring system may cause an associated device to lock, encrypt, and/or backup data. The monitoring system may send a signal to each device instructing backup/lock/encryption to begin.

An action to protect devices may be determined based on the classification of the event. For example, if a monitoring system classifies an event as a break-in, then the monitoring system may determine that devices should be protected from being stolen. This may involve locking the devices, encrypting data, and backing up data. If the event is classified as a flood or fire, the monitoring system may determine to backup data to a remote location or to a cloud storage account.

If the event is classified as a malware or cyberattack, then one or more devices may be disconnected from a network. For example, the monitoring system may learn, via antivirus software running on a second device, that the second device has been infected with a virus or other malware. The monitoring system may disconnect the second device or other devices from the gateway 340 to prevent the virus from further spreading. The infected device may be disconnected from other devices. For example, if the infected device is connected to another device via Bluetooth, the monitoring system may instruct one or both of the devices to terminate the connection. If it is determined that the gateway 340 has been breached by a cyberattack and/or contains malware, then one or more devices may be disconnected from the gateway 340.

Additionally/alternatively, the data on devices may be periodically encrypted. For example, as new data is saved on a device, the device may be caused to encrypt the new data. Additionally/alternatively, devices may encrypt data every day, every week, every month, every 6 months, or any other interval of time. Protecting devices may include erasing data and/or making the device inoperable. The monitoring system may wait to delete files stored locally on a computing device until after the files have been backed up.

Encrypting/backing up/deleting data on a device may depend on the type of data. The monitoring system may begin by encrypting, backing up, or deleting the most important files first. Files on a device may be categorized or marked by a user or the device to indicate which files are most important to address first. Additionally/alternatively, the monitoring system may determine a type of file based on the file name. Different types of data may include financial, personal records (family pictures, journals, birth certificates, etc.). A first type of data (e.g., financial data) may be most important and may be encrypted, backed up, and/or deleted before a second type of data (e.g., personal photos) is encrypted, backed up, and/or deleted. However, the user or the device may determine the order of encryption, backup, deletion or any other action that is performed on the files.

Data of varying sizes may be encrypted, backed up, or deleted depending on user preferences, the alarm state, and the classification of the event. For example, the monitoring system may determine to encrypt, back up, or delete all of the data on the device or just a portion of the data on the device. Encrypting, backing up, or deleting data on a device may depend on the severity of event. The monitoring system may encrypt, back up, or delete certain files or data and leave others alone if the event is not severe. In the case of a severe event, the device may encrypt all files.

In one example, the alarm system of the motorized vehicle 312 may be triggered. The motorized vehicle may be disabled from starting the engine until the motorized vehicle or a monitoring system receives a correct security code.

In step 612, whether to protect data on accounts may be determined based on user preferences and/or the classification of the event. Accounts may include any account that is associated with a monitoring system's associated devices. Accounts may include entertainment (Netflix, Amazon Prime, Hulu, etc.), banking, social media (Facebook, Instagram, Snapchat, Reddit, LinkedIn, etc.), or any other account accessible online.

If a monitoring system determines that a cyberattack event has occurred (e.g., software running remotely or on a device notifies the system that an attack is targeting an account) then the monitoring system may determine to take action to protect an account. For example, if the monitoring system detects a phishing attack that is attempting to steal credentials for logging into an account then the monitoring system may take action to protect the account. The monitoring system may also determine that an unauthorized user is using or attempting to access an account. For example, the monitoring system may use a camera and facial recognition software to determine that an unauthorized user is attempting to access an account via a device associated with the monitoring system. If the monitoring system determines that an unauthorized user is attempting to access an account then the monitoring system may determine to protect the account.

In step 615, data on the accounts described in step 612 may be protected. The monitoring system may log out of the accounts on all or some devices and/or limit access to portions of content on accounts for some or all devices. Two factor authentication codes for one or more accounts may be requested. For example, the monitoring system may determine that an intrusion has occurred and that a device within the defined area is designated for two-factor authentication with an account. The monitoring system may request two factor authentication codes that can be used to gain access to the account without possession of the device.

In step 620, whether to flag a device as lost may be determined based on user preferences and/or the classification of the event. If a device is outside of range of a gateway the device may be flagged as lost. Alternatively, a user may manually flag a device as lost through the monitoring system.

A device associated with the monitoring system may encrypt, back up, and/or delete data after moving outside of range of the gateway or otherwise being unable to connect to the gateway. Additionally/alternatively, the device may become locked after moving outside of range of the gateway or being unable to connect to the gateway. If the device is within range of a separate monitoring system associated with, or trusted by the device's monitoring system then the device may remain unlocked and/or unencrypted. A hard disk lock on a device may remain locked if the device is disconnected or not within range of the gateway. The hard disk lock may remain unlocked if the device is within range of the gateway or is connected to a gateway of a trusted monitoring system.

After a device is locked, a user of another device, or other monitoring systems may be notified that the device was locked. After a device is locked, a user may be required to enter a password, face scan, a thumb print, and/or other biometric data to unlock the device. Additionally/alternatively, the device may require a connection with the gateway of a monitoring system (e.g., gateway 340) before unlocking. Additionally/alternatively, allowing a device to unlock may depend on how long the device has been disconnected from or out of range of the monitoring system (e.g., gateway 340). For example, if the device has been out of range of monitoring system's gateway for less than a predetermined time interval (e.g., 30 seconds, 5 minutes, 3 hours, etc.) then the monitoring system or device may accept a password to unlock the device. If the device has been out of range of a monitoring system's gateway for more than a predetermined time interval (e.g., 30 seconds, 5 minutes, 3 hours, etc.) then the monitoring system or device may require a password and biometric data to unlock the device.

One device may be paired with another device. Paired devices may communicate with each other via Bluetooth, Wi-Fi, a telecommunication network (such as Long-Term Evolution (LTE)), radio, or any other communication network or protocol. Distance between devices may be measured based on a signal strength between the two devices (e.g., Bluetooth) or by using GPS. The devices may share their locations with each other to determine how far apart they are. If one device is separated from its paired device by a distance that satisfies a threshold (e.g., greater than 20 feet, 50 feet, 100 yards, etc.), then one or both of the devices may become locked or have their data encrypted, deleted, or backed up. For example, a smartwatch may be paired with a smart phone. If the smart phone is stolen (or vice versa) and taken a distance that exceeds 100 yards from the smartwatch then the smart phone may lock itself and/or backup, delete, and/or encrypt data. The smart phone may also send a notification to the smartwatch. Additionally/alternatively, paired devices that are separated from each other by a distance that satisfies a threshold (e.g., greater than 20 feet, 50 feet, 100 yards, etc.) may prevent themselves from accessing financial applications or services (e.g., a bank application, investment accounts, etc.).

Determining whether to flag a device as lost may depend on the alarm state. If the alarm state is set to stay then a device may be flagged as lost if the device leaves the defined area or is located a predetermined distance from the defined area (20 feet, 100 meters, etc. from the boundary of the defined area).

In step 625, a device may be flagged as lost. The monitoring system may flag a device as lost by sending information to a headend or a centralized location that keeps track of lost devices. Information may include instructions on what to do if the device is located, a device ID, an owner of the device, contact information for the owner of device, make and model of device, etc. The monitoring system may flag a device as lost by sending a notification to other associated monitoring systems.

A monitoring system may identify devices that are nearby the monitoring system. If a device is within range of the gateway 340, the monitoring system may determine a device ID and other information from the device. The monitoring system may look up the device ID on a list of lost devices to determine if the device is lost. The monitoring system may communicate via a centralized location to notify a person of the discovery of the lost device. Additionally/alternatively, the other monitoring systems may be notified that the device was found. The monitoring system may notify law enforcement and provide information about a lost device including the last location detected. For example, a monitoring system may notify law enforcement that the device was within range of its gateway, and the location where the device was detected.

The monitoring system may assist in locating any lost device including devices not associated with any monitoring system. Devices may include instructions that allow them to be flagged as lost by a user. If devices that are flagged as lost come in range with a gateway (e.g., gateway 340 of a monitoring system) then the monitoring system may identify the device and notify a user or law enforcement as discussed above.

In step 630, information indicating a location of a device may be received. The device may have been previously flagged as lost in step 625. Information may be received from a headend indicating a location of the device. Additionally/alternatively, information may be received from other monitoring systems. Information indicating a location of a device may include a time that the device's location was discovered. A monitoring system may also track chips or devices that may be placed on pets such as a dog or cat. If the pet passes within range of a gateway of a separate monitoring system the separate monitoring system may send a notification to the monitoring system of the owner of the pet.

In step 635 other actions may be taken based on a classification of the event and/or based on user preferences. For example if a car (e.g., a connected car that is equipped with Internet access) that is associated with a monitoring system is stolen, then the monitoring system may communicate with the car and instruct it to use self-driving capabilities to return home.

Other actions may include actions responsive to movement in or out of zones as described in step 520 of FIG. 5. If a zone movement event is detected, actions may be taken to protect the zone that is being entered. For example if a person moves from zone 1 to zone 2 then a monitoring system may protect devices, accounts, and/or people located in zone 2. After detecting a zone movement event, the screen of a device may be locked and/or turned off. The screen of a device may be unlocked or turned on after the zone movement event has ended. For example, after the person from zone 1 has left zone 2 a monitoring system may return the devices to their prior state before the zone movement event was detected.

A notification may be sent to users within a zone. For example, if a person moves from zone 1 to zone 2, then one or more users within zone 2 may receive a notification of the movement. The notification may include information such as identification of the person that has entered the zone, the location where the person entered the zone, permissions of the person that has entered the zone (e.g., what data the person is allowed to access, areas that the person is allowed to access, etc.). The actions taken may depend on user preferences. For example, user preferences may indicate whether a user's screen should be locked or turned off if a zone movement event is detected. Other actions may include actions described in the description of FIG. 4. From step 635, the monitoring system may proceed to step 530 in FIG. 5 and continue monitoring the defined area.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, other optical disk storage, magnetic cassettes, magnetic tape, magnetic storage, and the like.

Additionally, or alternatively, in at least some embodiments, the methods and features recited herein may be implemented through one or more Integrated Circuits (IC s). An IC may be, for example, a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
receiving, by a computing device and from a sensor, information indicating an occurrence of an event;
determining, based on the occurrence of the event, an action to protect data accessible via a user device;
determining an association between a location of the user device and a location associated with the event; and
causing, based on the association, the user device to perform the action.

2. The method of claim 1, wherein the data is stored on the user device, and wherein the action comprises copying the data to another computing device.

3. The method of claim 1, wherein the action comprises encrypting the data.

4. The method of claim 1, wherein the data is stored on the user device and on one or more other computing devices, and wherein the action comprises deleting the data from the user device.

5. The method of claim 1, wherein the action comprises preventing access to the data via the user device and providing access, via the user device, to second data different from the data.

6. The method of claim 1, wherein the computing device is located at a premises, wherein the premises comprises the location associated with the event, and further comprising:
sending, by the computing device to a second computing device located remotely from the premises, a notification indicating the occurrence of the event.

7. The method of claim 6, wherein the notification comprises a video recording corresponding to the event.

8. The method of claim 1, wherein the user device is associated with a user, wherein the event comprises movement of an individual, different from the user, to a region of a premises, and wherein the action comprises locking the user device.

9. The method of claim 8, further comprising:
unlocking, based on a determination that the individual has left the region, the user device.

10. The method of claim 1, wherein the computing device is located at a premises, wherein the premises comprises the location associated with the event, wherein the event comprises unauthorized access to the premises by a person, and wherein the action comprises encrypting the data.

11. The method of claim 1, wherein the computing device is located at a premises, wherein the premises comprises the location associated with the event, wherein the event comprises a flood, and wherein the action comprises copying the data to a computing device located remotely from the premises.

12. A method comprising:
- receiving, by a computing device, information indicating an occurrence of an event associated with a premises;
- determining, based on the occurrence of the event, an action to protect data;
- determining one or more additional computing devices, associated with the premises, via which the data may be accessed; and
- causing, based on the occurrence of the event, the determined one or more additional computing devices to perform the action.

13. The method of claim 12, wherein the event comprises detection of malware, and wherein the action comprises disconnecting from one or more networks.

14. The method of claim 12, wherein the action comprises logging out of one or more accounts that are accessible via the one or more additional computing devices.

15. The method of claim 12, wherein the data comprises a first type of data and a second type of data, and wherein the action comprises encrypting the first type of data and encrypting the second type of data after the first type of data has been encrypted.

16. The method of claim 12, wherein the computing device is located at the premises, wherein the event comprises a flood at the premises, and wherein the action comprises copying the data to a computing device located remotely from the premises.

17. A method comprising:
- receiving, by a computing device, information indicating an occurrence of an event associated with a premises;
- determining, based on the occurrence of the event, an action to prevent access to data;
- determining a location of a user device associated with the premises; and
- based on the occurrence of the event and on the location of the user device, causing the user device to perform the action.

18. The method of claim 17, wherein the action comprises encrypting the data.

19. The method of claim 17, wherein the action comprises deleting the data from the user device.

20. The method of claim 17, wherein action comprises logging out of one or more accounts that are accessible via the user device.

* * * * *